(12) United States Patent
Ellis

(10) Patent No.: US 6,308,402 B1
(45) Date of Patent: Oct. 30, 2001

(54) APPARATUS FOR MANUFACTURING SELF-SEALING REINFORCEMENT TIE RODS FOR HVAC DUCTS

(76) Inventor: Stanley J. Ellis, 2602 Courtland St., Orange, CA (US) 92867

(*) Notice: Subject to any disclaimer, the term of this patent is extended or adjusted under 35 U.S.C. 154(b) by 0 days.

(21) Appl. No.: 09/448,983

(22) Filed: Nov. 24, 1999

(51) Int. Cl.[7] .................................................. B23P 21/00
(52) U.S. Cl. ............................ 29/715; 29/282; 29/283.5; 29/709; 72/402
(58) Field of Search .......................... 29/505, 282, 283.5, 29/715, 517, 709; 72/402

(56) References Cited

U.S. PATENT DOCUMENTS

| | | | |
|---|---|---|---|
| 3,603,132 | * 9/1971 | Holmes | 72/402 |
| 3,662,450 | * 5/1972 | Kish et al. | 29/237 |
| 4,232,443 | * 11/1980 | Lichtenstein et al. | 29/753 |
| 4,724,990 | * 2/1988 | Yoshieda et al. | 227/8 |

* cited by examiner

*Primary Examiner*—P. W. Echols
*Assistant Examiner*—John C. Hong
(74) *Attorney, Agent, or Firm*—William L. Chapin

(57) ABSTRACT

A method and apparatus are for use in the manufacture of self-sealing reinforcement tie rods for reinforcing HVAC ducts, of the type including an elongated threaded rod having fastened inwardly of each end thereof an abutment structure comprising an elongated hollow tubular body having a bore therethrough for coaxially receiving the rod, the tubular body having a longitudinally inwardly located tubular crown portion for attachment to the rod, and a longitudinally outwardly located, radial outwardly protruding annular flange portion for abutting and bracing a duct wall. The apparatus includes a work plate having in the upper surface thereof a slot having a lower wall which slopes downwardly and radially inwardly towards the center of the work plate, on which are positioned a single file line of abutment structures, flange down. The inner radial end of the slot terminates in a generally semi-circularly-shaped end wall which defines with the lower slot wall of the slot a cavity for locating a single abutment structure coaxially over a pilot bore which protrudes downwardly from the lower slot wall. The apparatus includes at least a first pair of diametrically opposed ram punches having a radially inwardly directed line of action centered on the longitudinal axis of the pilot bore, and preferably a second pair of such ram punches rotated ninety degrees with respect to the first pair, each ram punch having at an inner longitudinal end thereof at least a first and preferably two vertically aligned chisel points. A linear actuator pivotably coupled by lever arms to outer radial ends of the ram punches reciprocally moves the ram punches. According to the method of the invention, a rod is inserted downwardly through an abutments structure into the pilot bore to a predetermined protrusion distance below the abutments structure flange, whereupon a sensor switch at the bottom of the pilot bore energizes the linear actuator to drive the ram punches radially inwardly to crimp the tubular portion of the abutment structures to the rod, and withdraw the punches after a predetermined time interval.

20 Claims, 8 Drawing Sheets

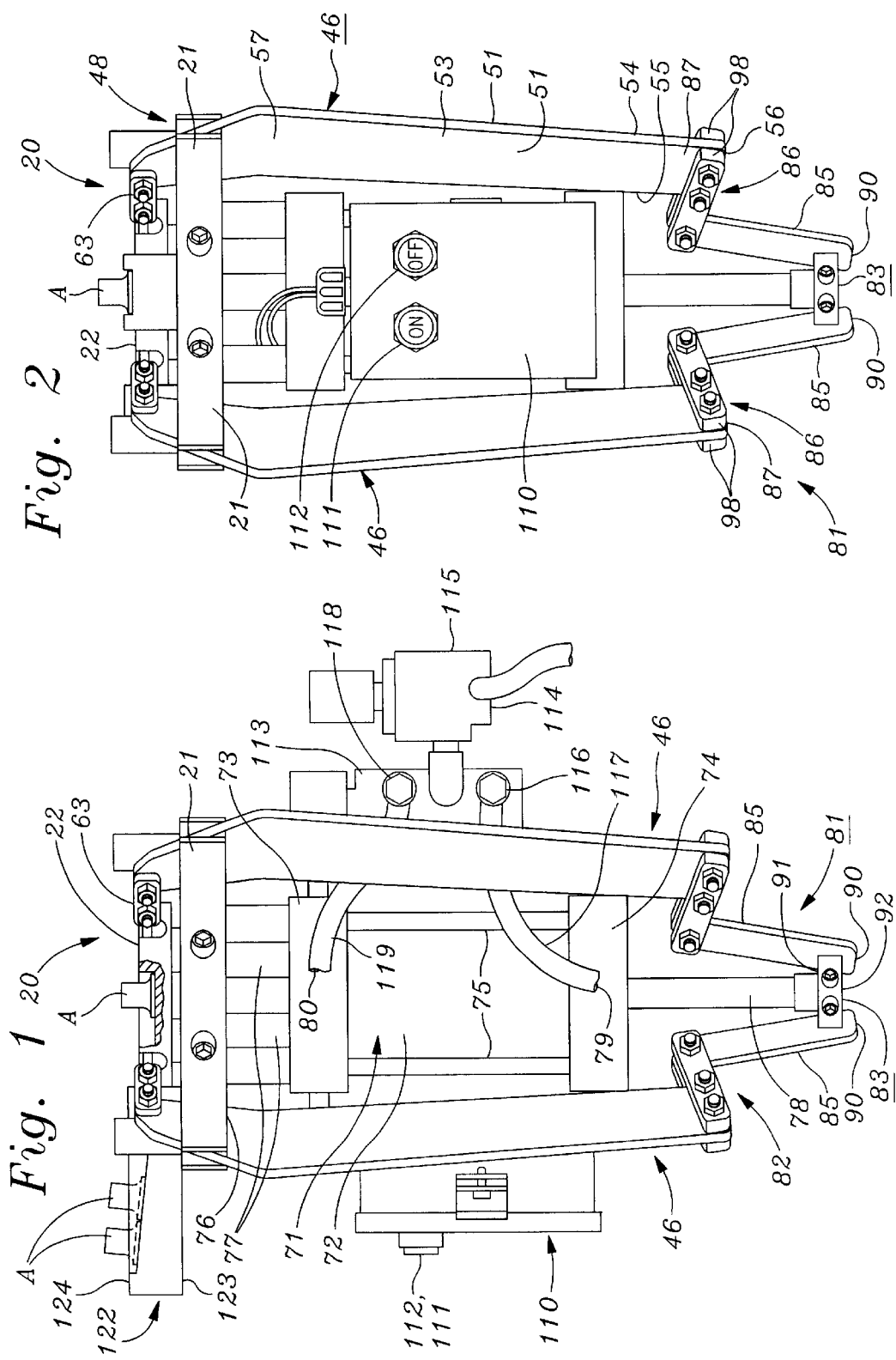

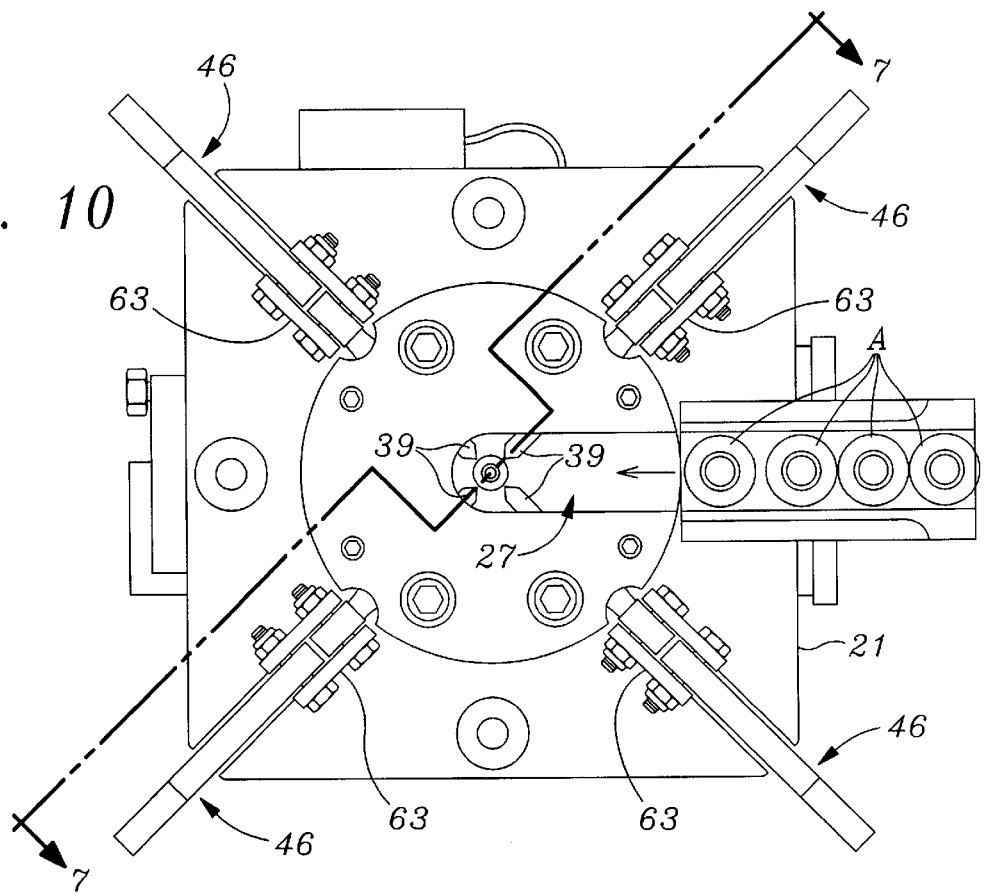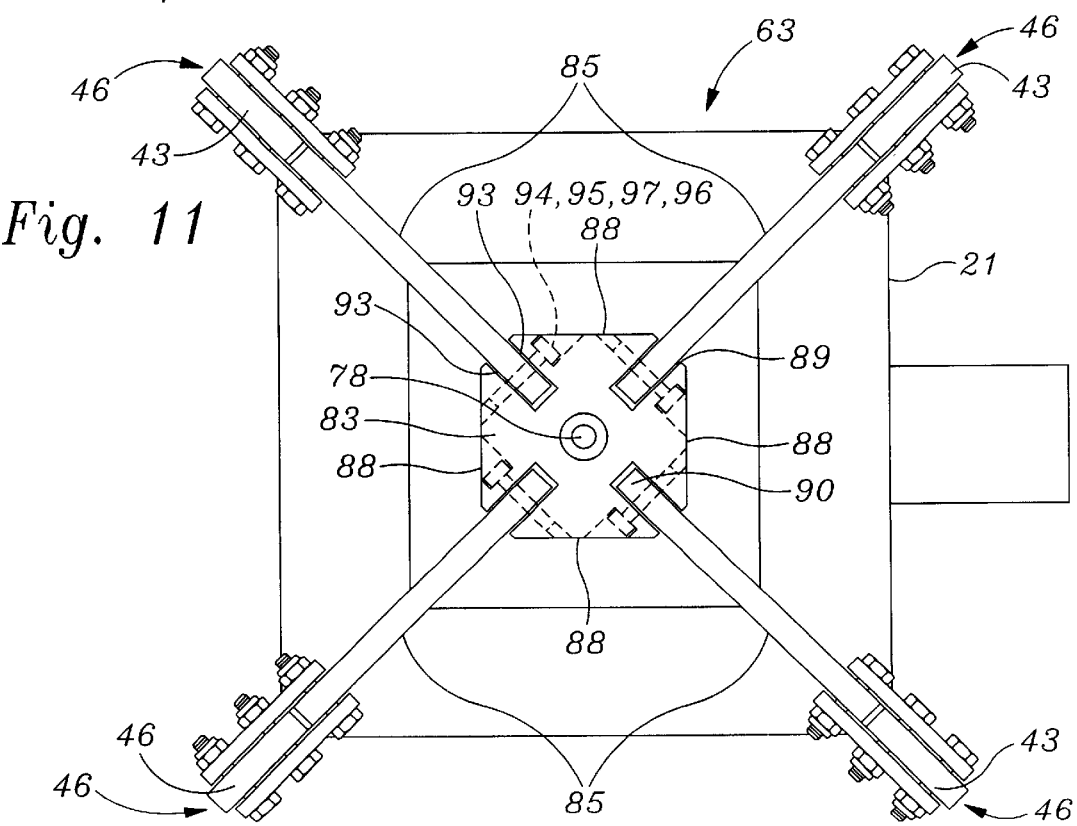

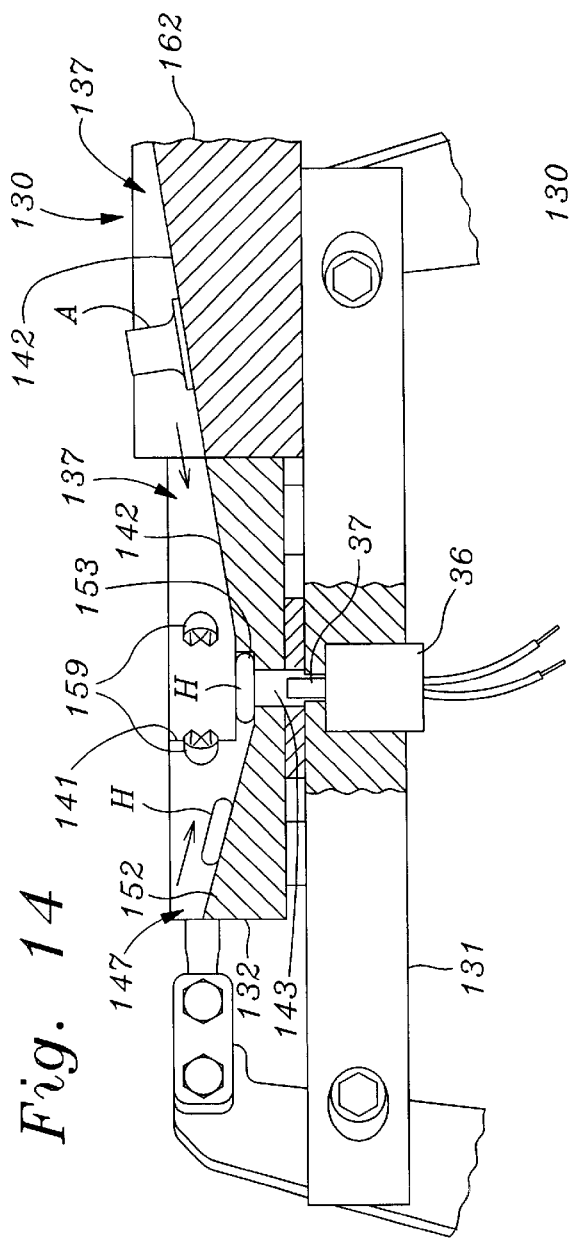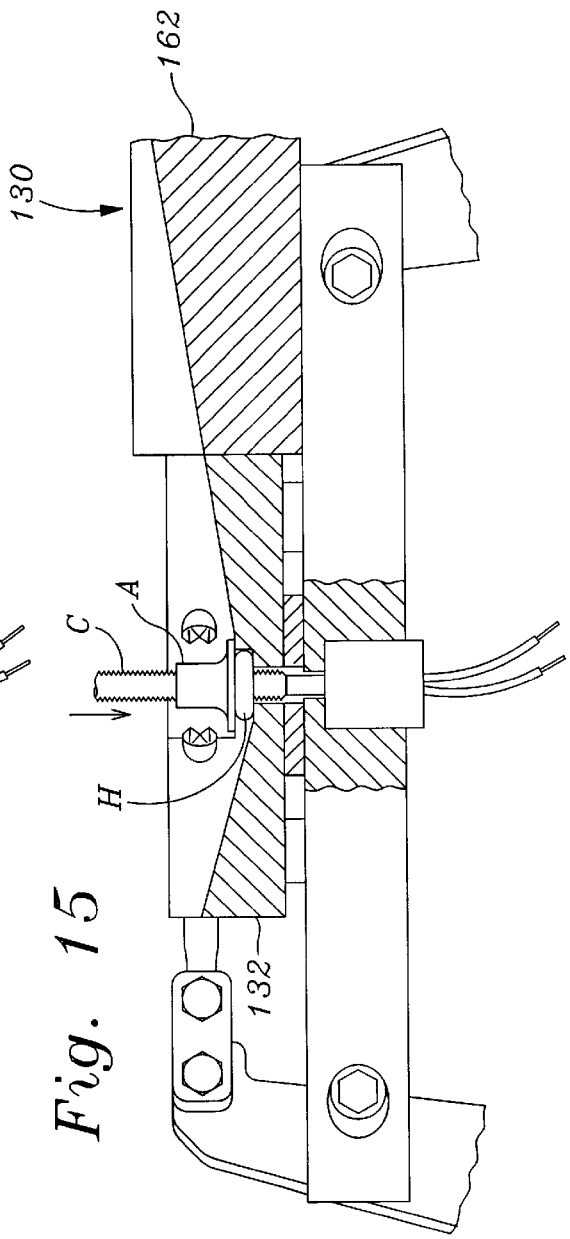

APPARATUS FOR MANUFACTURING SELF-SEALING REINFORCEMENT TIE RODS FOR HVAC DUCTS

BACKGROUND OF THE INVENTION

A. Field of the Invention

The present invention relates to tie rods of the type used to reinforce ventilating ducts which convey air for heating, ventilating or air conditioning (HVAC) the interior spaces, of buildings or similar structures. Such tie rods are used to prevent excessive flexure of duct walls in response to fluctuations of air pressure exerted on walls of the duct More particularly, the invention relates to a method and apparatus for manufacturing self-sealing reinforcement tie rods for ventilating ducts.

B. Description of Background Art

Ductwork used to heat, ventilate, or air condition buildings usually consists of elongated lengths of tubing comprising individual duct sections which are coupled together to form a continuous, air-tight duct for conveying flowing air. Typical duct tubing is made of a material such as sheet metal which is relatively strong but sufficiently light in weight to minimize the size and weight of fasteners and structural components required to support the ductwork, as well as maintaining materials and fabrication costs of the ductwork itself at reasonable levels. Thus, typical ducts are made of relatively thin sheet steel ranging in thickness from 26 gauge (0.0188 inch thick) to 16 gauge (0.0625 inch thick).

Sheet metal ducts have rectangular, circular or oval cross section shapes, and are often manufactured and supplied in precut lengths or sections with transversely outwardly protruding interconnection flanges provided at opposite longitudinal ends of the section, to facilitate interconnecting duct sections at a job site and thus forming air conveying ducts of desired lengths and orientations.

Ducts of the tape described above are available in a wide variety of sizes, having cross-section dimensions which range from a few inches to several feet. Moreover, a wide range of width-to-height or aspect ratios of rectangular ducts are available. For example, a typical 18 inch high duct may have a width in the range of 2 feet to 4 feet, and a length of 5 feet. Whatever the shape, size and aspect ratio of the duct, the relatively small thickness of its walls relative to its cross-sectional dimensions results in the duct walls being relatively flexible. Thus, conventional ducts may experience relatively large, possibly destructive deformations if static or dynamic differential air pressure between the interior and exterior of the duct exceeds predetermined threshold values. For this reason, mechanical engineering standards as well as applicable building codes require that duct work used to conduct air in certain heating, ventilating, and air conditioning (HVAC) applications be reinforced against expansion when positively pressurized and/or against collapse when negatively pressurized.

A widely employed reinforcement method that meets code requirements consist of installing elongated straight, rigid reinforcement members within a duct at predetermined spacings which depend upon the rigidity of the duct, and upon the maximum differential pressures which it may encounter. Such reinforcement members are disposed perpendicularly between inner surfaces of opposite walls of the duct and fastened at opposite ends thereof to those walls. One such approved reinforcement member which is in current use consists of a threaded steel tie rod which has installed onto each end thereof a first, inner nut which is threadingly advanced to a predetermined distance inward from the end of the rod. The distance between the outer faces of the inner nuts is made equal to the minimum cross-sectional dimension, i.e., the height of the duct. The tie rod is positioned within a duct perpendicularly between a pair of opposed walls of the duct, and opposite ends of the threaded rod are each inserted through a separate one of a pair of transversely or vertically aligned holes provided through the duct walls. A pair of external nuts are then threaded onto the opposite ends of the threaded rod which protrude outwardly through the duct wall holes. Each external nut is then tightened onto the threaded rod against the outer surface of the duct wall, while the adjacent inner nut is held against rotation with a separate wrench. For large ducts, this operation requires two workmen.

Another prior-art duct reinforcement uses an elongated tube containing in opposite ends of the bore openings thereof an internally threaded fastener member which is fixed in the tube and which is adapted to receive a machine screw inserted through a duct wall hole. This reinforcement method also sometimes requires that the tube being gripped while the external machine screw is torqued, which again may require two workmen.

A third type of prior art tie rod used to reinforce HVAC ducts, which is a variation of the first method, uses a tube which encloses a threaded rod, the latter being secured between the walls of the duct by two external nuts, and is no easier to install than the other two types described above.

In addition to being somewhat difficult and time consuming to install, in accordance with certain code requirements, prior art reinforcement tie rods of the type discussed above must make an air-tight seal with the duct wall holes through which they protrude, thus requiring installation of a resilient sealing element such as a gasket or washer between the exterior nut or screw head and the duct wall. If the exterior nut or screw is torqued too tightly, such resilient elements can be deformed or damaged, and may ultimately fail to achieve sealing.

Motivated by limitations of prior art rod fasteners of the type discussed above, the present inventor developed a self-sealing reinforcement tie rod for reinforcing ventilating ducts. That tie rod was disclosed in the present inventors U.S. patent application Ser. No. 09/307,270, filed May 7, 1999, now U.S. Pat. No. 6,116,833. The novel reinforcement tie rod disclosed in the foregoing reference includes a length of threaded steel rod which is slightly longer, e.g., about 1 ¼ inches, longer than the height of ducts which the tie rod is intended to reinforce. Thus, for use in 12-inch high ducts, the threaded rod portion of the tie rod according to the previous invention may have a typical diameter of about ⅜-inch and a length of about 13 ¼ inches. The tie rod according to the prior invention also includes a pair of abutment structures fastened to opposite end portions of the threaded rod, inwards of the outer transverse end walls of the rod. Each abutment structure includes a longitudinally inwardly located tubular part which receives the threaded rod, and is permanently fastened thereto by, for example, crimping the wall of the tubular section into the threads of the rod. Each abutment structure also includes at longitudinally outwardly located annular flange which is disposed transversely to the axis of the threaded rod. The longitudinal spacing between the outer transverse walls of the abutment structure flanges is made nearly equal to the height of the duct. Thus, when the rod is placed inside a duct and opposite ends of the rod are inserted outwardly through a pair of vertically aligned holes made in the upper and lower walls of the duct, the outer transverse surfaces of the two abutment structure flanges abut the opposed inner duct wall surfaces, and each end of the rod protrudes about ⅝-inch outwardly from the adjacent duct wall.

According to the prior invention, the outer longitudinal portion of the bore in the tubular part of each abutment structure flares arcuately outwardly to join the outer transverse flange wall of the abutment structure, forming an annular cavity between the flange wall surface and threaded rod. The cavity has a diameter which tapers smoothly radially and longitudinally outwardly towards the flange. Prior to installation of the tie rod in a duct, a pair of resilient O-rings having an inner diameter slightly less than that of the threaded rod are slipped onto opposite outer ends of the rod.

The tie rod according to the prior invention also includes a pair of internally threaded fasteners located externally to the duct, which are threaded onto opposite ends of the threaded rod which protrude outwardly through the duct walls. In the preferred embodiment, each external threaded fastener consists of a flare nut having an outer hexagonal head and an inner annular skirt flange which flares outwardly from the head, the skirt having a flat lower or inner surface. When the flare nut is threaded down onto the protruding length of the threaded rod, and tightened down onto the outer surface of a duct wall, the O-ring is compressed between the inner surface of the duct wall and the outer transverse wall of an abutment structure flange. Further tightening of the flange nut on the threaded rod causes the O-ring to cold flow partially into the arcuately curved annular cavity between the flange wall and rod, and against the outer cylindrical wall surface of the threaded rod, thus forming a highly effective hermetic seal of the hole through the duct wall.

The present invention provides an efficient method and apparatus for manufacturing self-sealing reinforcement tie rods of the type described above.

OBJECTS OF THE INVENTION

An object of the present invention is to provide a method for manufacturing self-sealing reinforcement tie rods for reinforcing HVAC ducts, in which flanged abutment structures for abutting opposed walls of a duct are permanently secured onto opposite ends of a threaded tie rod.

Another object of the invention is to provide a method for crimping a tubular abutment structure onto a threaded tie rod.

Another object of the invention is to provide a method for permanently crimping the tubular crown of a flanged abutment structure onto a threaded rod, by crimping the outer wall surface of the crown with sufficient radially inwardly directed force to permanently indent the threaded rod and force cold flow of a portion of the inner wall surface of the crown into the indentation.

Another object of the invention is to provide a method for manufacturing self-sealing reinforcement tie rods in which a threaded tie rod is inserted through the inner bore of the tubular crown portion of a flanged abutment structure to a predetermined extension distance outward of the outer, flanged portion of the abutment structure, and a plurality of crimps are made externally into the outer longitudinal wall surface of the crown with sufficient force to indent the longitudinal wall surface of the threaded rod and force a portion of the inner longitudinal wall surface material of the crown to cold-flow into permanent locking engagement within the indentation in the threaded rod.

Another object of the invention is to provide a method for manufacturing a self-sealing reinforcement tie rod in which the outer flanged portion of a flanged abutment structure is positioned on a work surface, a threaded tie rod is inserted into the bore of the abutment, structure to a predetermined extension distance beyond the outer surface of the flange portion and below the work surface, and radially inwardly directed crimping forces applied to the external longitudinal wall surface of the crown portion of the abutment structure, of sufficient magnitude to permanently deform the longitudinal wall surface of the threaded rod and cause cold flow of the inner wall surface of the crown portion into permanent locking engagement within indentations in the threaded rod.

Another object of the invention is to provide a method for manufacturing a self-sealing reinforcement tie rod in which an O-ring is positioned on a work surface, the flange portion of a tubular abutment structure is positioned coaxially over the O-ring, a threaded tie rod is inserted into the bore of the crown portion of the abutment structure a predetermined extension distance outward of outer transverse wall surface of the flange and the O-ring, and radially inwardly directed crimping forces applied to the outer longitudinal wall surface of the crown surface of the abutment structure, of sufficient magnitude to permanently indent the longitudinal wall surface of the threaded rod and induce cold flow of radially overlying portions of the inner wall surface of the crown into permanent locking engagement within the indentations.

Another object of the invention is to provide an apparatus for manufacturing self-sealing reinforcement tie rods for HVAC ducts which includes a work table having in the surface thereof an indentation for receiving the outer flange portion of a tubular abutment structure, two pairs of diametrically opposed punches longitudinally spaced circumferentially apart at ninety degree intervals, and actuator means for forcing the punches radially inwardly against the outer longitudinal wall surface of the upper crown portion of the abutment structure with sufficient force to permanently indent the outer longitudinal wall surface of a threaded tie rod inserted into the bore of the abutment structure, and cause cold-flow of a portion of the inner longitudinal wall surface of the crown into the indentations.

Various other objects and advantages of the present invention, and its most novel features, will become apparent to those skilled in the art by perusing the accompanying specification, drawings and claims.

It is to be understood that although the invention disclosed herein is fully capable of achieving the objects and providing the advantages described, the characteristics of the invention described herein are merely illustrative of the preferred embodiments. Accordingly, I do not intend that the scope of my exclusive rights and privileges in the invention be limited to details of the embodiments described. I do intend that equivalents, adaptations and modifications of the invention reasonably inferable from the description contained herein be included within the scope of the invention as defined by the appended claims.

SUMMARY OF THE INVENTION

Briefly stated, the present invention comprehends a method and apparatus for manufacturing self-sealing reinforcement tie rods of the type used to reinforce ventilating ducts which convey air for heating, ventilating or air conditioning (HVAC). This type of tie rod includes an elongated threaded rod having a pair of abutment structures adapted to brace opposite walls of a duct. The abutment structures are fitted coaxially over the threaded rod and secured to the rod inwardly of opposite ends of the rod. The abutment structures which the method and apparatus of the present invention are intended to be used with each comprise a circularly symmetric, hollow tubular body having an inner longitudinal portion consisting of a cylindrically-shaped tubular crown section, and an outer longitudinal portion consisting of a transversely disposed, circular flange section. The body of the abutment structure has a central coaxial bore of slightly larger diameter than the threaded rod to which a pair of abutment structures are fastened to assemble a self-sealing tie rod.

An apparatus for manufacturing self-sealing reinforcement tie rods according to the present invention includes a work plate having an upper surface in which is formed a shallow circular depression or cavity of the appropriate diameter to coaxially receive the outer flanged portion of an abutment structure, the depression having a lower flat support wall which supports the outer transverse wall surface of the flange. The support wall has formed therein a central coaxial pilot bore which has a diameter slightly larger than that of the threaded rod component of the self-sealing reinforcement tie rod. A base wall at the lower end of the pilot bore limits downward movement of the end of a tie rod inserted into the bore of the abutment structure to a predetermined extension distance of the tie rod below or outward of the outer transverse wall surface of the abutment structure flange.

The tie rod manufacturing apparatus according to the present invention includes at least a first pair of diametrically opposed ram punches having a radially inwardly directed line of action, each ram punch having at the inner end thereof a pair of vertically spaced apart chisel points which provide a pair of vertically aligned crimping surfaces which are driven radially inward by a ram actuator mechanism to a radial spacing slightly less than the diameter of the tie rod. Preferably, the apparatus includes a second pair of diametrically opposed ram punches similar to the first pair, but spaced circumferentially apart at a ninety-degree interval from the first pair of punches. The apparatus according to the present invention includes a pneumatic actuator cylinder which is coupled by lever arms to the ram punches, and a sensor for determining when a tie rod has been inserted a predetermined extension distance through an abutment structure, i.e., to the bottom of the pilot bore. The sensor produces an output signal which opens a solenoid that admits pressurized air to the actuator cylinder, causing a piston within the cylinder to produce an actuation force which drives the ram punches radially inward for a predetermined time interval.

A method for manufacturing self-sealing reinforcement tie rods according to the present invention includes the steps of placing the outer flange portion of a tubular abutment structure at a predetermined location on a work table plane, inserting a threaded tie rod through the central coaxial bore of the abutment structure to a predetermined extension distance therefrom, actuating at least a first pair of diametrically opposed, radially inwardly acting ram punches each having a pair of radially inwardly protruding tips which each indent both a portion of the tubular crown portion of the abutment structure and an underlying portion of the threaded rod, thereby causing cold-flow of a portion of the inner longitudinal wall of the crown into locking engagement with indentations formed in the tie rod, and then retracting the ram punches.

BRIEF DESCRIPTION OF THE DRAWINGS

FIG. 1 is a front elevation view of an apparatus for manufacturing self-sealing tie rod fasteners for HVAC ducts according to the present invention.

FIG. 2 is a right side elevation view of the apparatus of FIG. 1.

FIG. 10 is an upper plan view of the apparatus of FIG. 1, activated as shown in FIG. 8.

FIG. 11 is a lower plan view of the apparatus of FIG. 1, activated as shown in FIG. 8.

FIG. 14 is a longitudinal sectional view of the apparatus of FIG. 13, taken along line 14—14 and showing an O-ring prepared for installation on a tie rod by having been loaded into a holding cavity in the upper surface of a work plate of the apparatus.

FIG. 15 is a view similar to that of FIG. 14, but showing an abutment structure prepared for fastening to a tie rod by loading the abutment structure flange downward into the holding cavity on top of the O-ring, and showing a tie rod inserted partially through the abutment structure and O-ring.

DESCRIPTION OF THE PREFERRED EMBODIMENTS

Figure 3:
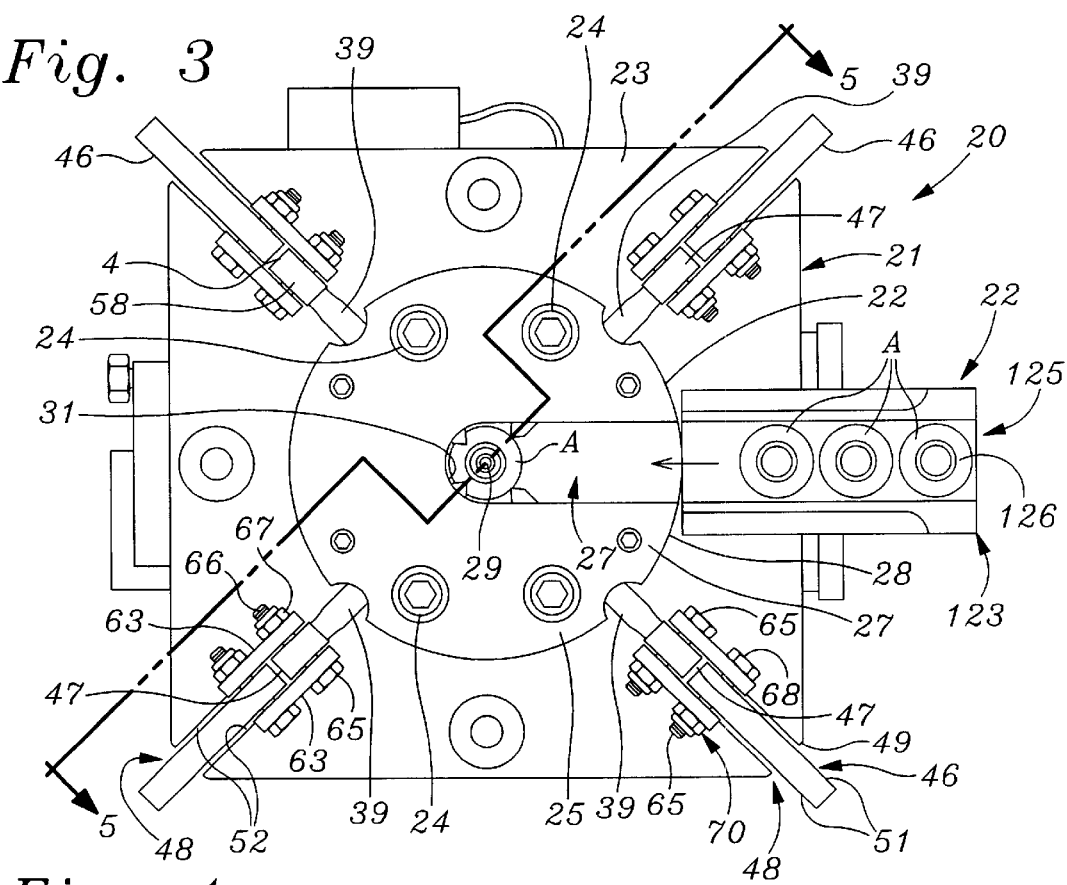
FIG. 3 is an upper plan view of the apparatus of FIG. 1.

Referring now to FIGS. 1–16, an apparatus for manufacturing self-sealing reinforcement tie rods is shown. As will be described in greater detail below, the apparatus functions semi-automatically to crimp a pair of abutment structures onto opposite ends of a tie rod, thus forming a complete self-sealing tie rod.

Referring now to FIGS. 1–4, an apparatus 20 for manufacturing self-sealing tie rods for reinforcing HVAC ducts may be seen to include an upper work table or apparatus support plate 21 which comprises essentially a relatively thick metal plate of uniform thickness and square plan-view cross section. As may be seen best by referring to FIG. 3, apparatus 20 includes a circular work plate 22 mounted concentrically on the flat upper surface 23 of support plate 21. Work plate 22 is secured in flat overlying relationship to upper surface 23 of support plate 21 by any convenient means, as, for example, by bolts 24 arranged in a rectangular pattern concentric with the work plate.

Figure 5:
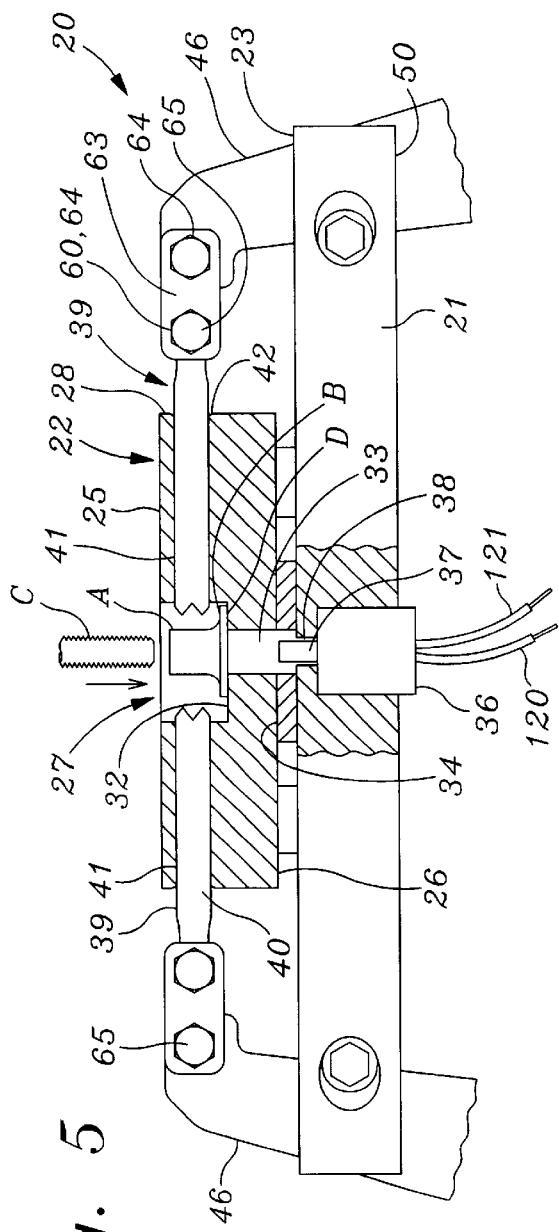
FIG. 5 is an oblique elevation view, partly in section, of the apparatus of FIG. 3, taken along line 5—5 and showing an abutment structure prepared for fastening to a tie rod by having been loaded flange downward into a holding cavity in the upper surface of a work plate of the apparatus.

Referring now to FIG. 5 in addition to FIG. 3, it may be seen that work plate 22 has generally flat and parallel upper and lower surfaces 25 and 26, respectively. Plate 22 also has formed in upper surface 25 thereof an elongated rectangular transverse cross section notch 27 which penetrates the outer circumferential wall surface 28 of the plate and extends radially inwardly therefrom to a location beyond the center 29 of the work plate. As shown in the figures, notch 27 has parallel vertical side walls 30 which are joined at a location beyond center 29 of the work plate by a vertically disposed, arcuately curved inner end wall 31. As shown in FIG. 3, inner end wall 31 of notch 27 has a generally semi-circular shape, concentric with center 29 of work plate 22, and has a diameter slightly larger, e.g., 0.010 inch, than that of circular flange brim B of an abutment structure A.

Referring again to FIG. 5 as well as FIG. 3, it may be seen that lower flat wall 32 of notch 27 in circular work plate 22 has formed therein a coaxially centrally located, circular cavity or pilot bore 33. Pilot bore 33 of work plate 22 has a lower base wall 34 located below, lower flat wall 32 of notch 27 at a depth equal to the desired protrusion length of the end of a threaded rod C beyond the outer transverse surface D of flange brim B.

As may be seen best by referring to FIG. 5, apparatus 20 is provided with a sensor for providing a signal which indicates when the end of a tie rod inserted through an abutment structure A in notch 27 has protruded a predetermined distance below outer surface D of the abutment structure flange B. As shown in FIG. 5, this sensor 35 consists of a normally open push button type micro switch 36 having a push button 37 which protrudes upwardly through a central coaxial perforation 38 provided through base 34. The purpose and function of sensor 35 will be discussed in detail below.

Referring still to FIGS. 3 and 5, it may be sen that apparatus 20 includes two pairs of diametrically opposed ram punches 39 each having a line of action directed radially inwards towards center 29 of work plate 22. As shown in FIG. 5, each ram punch 39 includes a longitudinally elongated cylindrical body or shank 40 slidably disposed in a radial bore 41 which has an entrance opening 42 in outer circumferential wall surface 28 of work plate 22, and an exit opening 43 in curved inner wall surface 31 of notch 27.

As shown in FIG. 3, apparatus 10 is provided with two pairs of ram punches 39, the longitudinal axes of which are aligned with two diagonals of square upper support plate 21, thus spacing apart the lines of action of the two pairs of ram punches at a ninety-degree circumferential interval.

As shown in FIG. 5, the inner radial end 44 of each ram punch 39 has formed therein a pair of vertically disposed, vertically aligned, chisel-like tips 45.

Referring now to FIGS. 1–3 in addition to FIG. 5, it may be seen that each ram punch 39 is radially reciprocally driven by a separate one of four vertically disposed lever arms 46 pivotably coupled at the upper end thereof to the rear end 47 of the ram punch shank 40. As shown in FIG. 3, the upper end of each lever arm 46 protrudes upwardly through a separate one of four rectangular cross section notches 48 which extend diagonally inwardly from the four corners 49 of support plate 21, the notches penetrating both upper surface 23 and the lower surface 50 of the work plate. Each lever arm 49 has parallel vertical side walls 51 which are spaced apart at a thickness less than the spacing between opposite vertical side walls 52 of notch 48, permitting free movement in a vertical plane of the lever arm within the notch.

As shown in FIGS. 1–5, each lever arm 46 has the overall appearance of plate of generally uniform thickness, having parallel front and rear side walls 51 that lie in vertical planes. In elevation view, each lever arm 46 may be seen to have a relatively long, longitudinally elongated lower bar portion 53 having an approximately rectangular shape, with a straight outer longitudinally disposed side wall 54. As shown in FIGS. 1 and 2, the inner longitudinally disposed side wall 55 of lever arm 46 has a lower portion which angles towards outer wall 54 and the bottom transverse end wall 56 of the ever arm, thus reducing the width of the lower portion of the lever arm and giving it a trapezoidal shape.

As may be seen best by referring to FIGS. 1 and 2, each lever arm 46 has an inwardly angled and tapered upper end portion 57 which angles upwardly and inwardly through a separate diagonal notch 48 in support plate 21. The upper end portion 57 of each lever arm is pivotably coupled near the inner end thereof to an enlarged diameter journal boss 58 formed at the outer end of shank 40 of each ram punch 39. Thus, as shown in FIGS. 3 and 5, boss 58 at the outer longitudinal end or base 47 of ram punch shank 40 has through its thickness dimension a transversely and horizontally disposed bore 60, which functions as a first, inner, ram punch pivot journal. Also, inner transverse end 61 of upper end portion 57 of each lever arm 46 has through its thickness dimension a transversely and horizontally disposed bore 62, which functions as a second, outer, lever arm pivot journal. The respective ends 47 and 61 of a ram punch 39 and lever arm 46 are coupled together by a pair of laterally spaced apart, vertically oriented, parallel linkage plates 63, located on opposed transverse sides of the ram punch and lever arm. Each linkage plate 64 has through its thickness dimension a pair of longitudinally spaced apart perforations 64, and a pair of linkage plates is secured at a first, inner end thereof to ram punch 39 by a bolt 65 having a shank 66 which protrudes inwardly through a first linkage plate perforation, through ram punch journal bore 60, and out through a first perforation of a second linkage plate, where the aforementioned parts are secured together by a nut 67. Similarly, the pair of linkage plates 63 are each secured at a second, outer end thereof to inner end 61 of a lever arm 46 by a second bolt 68, having a shank 69 which protrudes through rear perforations 64 of the linkage plates and through upper lever arm journal bore 62, the bolt having a nut 70 tightened onto its shank to secure the aforementioned parts together.

Referring now to FIGS. 1 and 2, it may be seen that apparatus 20 includes a pneumatic actuator cylinder 71. Pneumatic actuator cylinder 71 has a cylinder body 72 secured between upper and lower square bulkhead plates 73 and 74 by four longitudinally disposed strut rods 75 fastened to the bulkhead plates near the corners of the plates. Pneumatic actuator cylinder 71 is fastened below lower surface 76 of apparatus support plate 28 with the longitudinal axis of the cylinder perpendicular to the support plate, as, for example, by fastening bolts 77 disposed between upper bulkhead plate 73 and the apparatus support plate.

Figure 7:
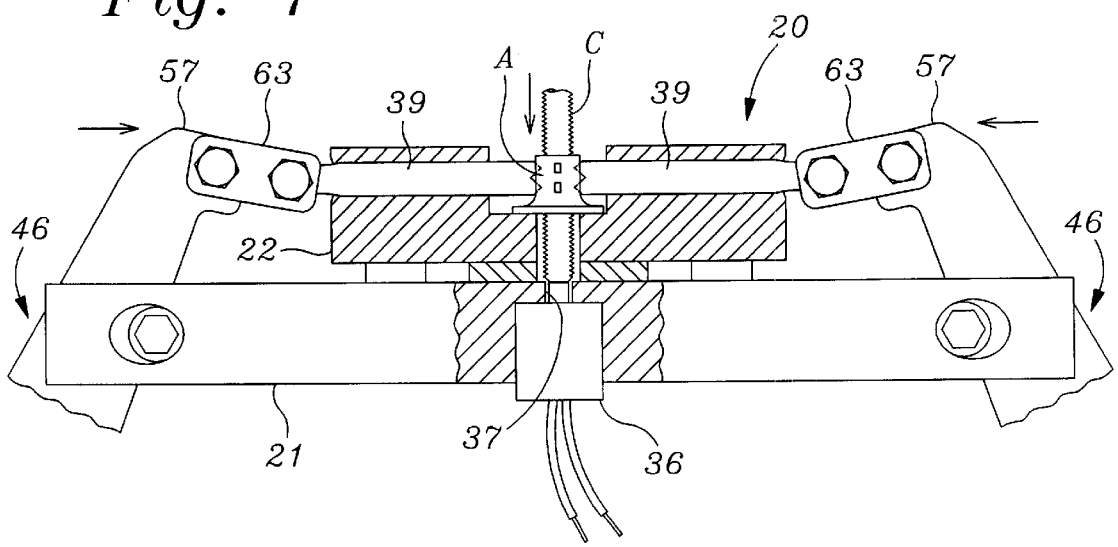
FIG. 7 is a view similar to that of FIG. 6, but showing the tie rod fully extended through the abutment structure and into a pilot bore of the apparatus, to depress an electrical switch button which opens a solenoid valve to thereby apply pressurized air to a first, upstroke port of a pneumatic actuator cylinder comprising part of the apparatus.
Figure 9:
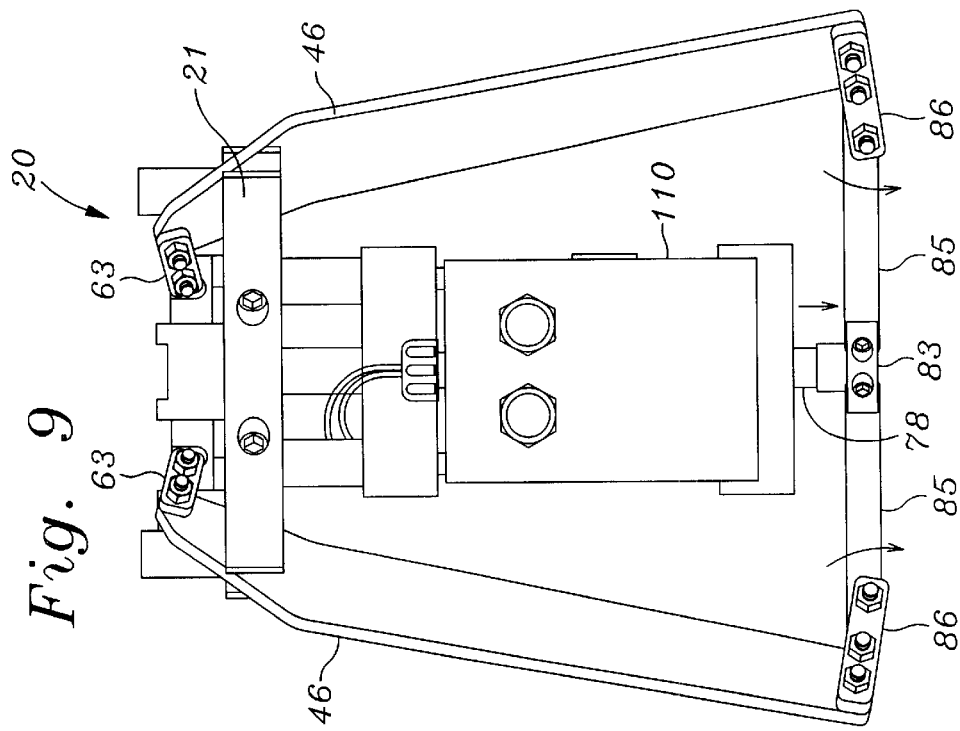
FIG. 9 is an side elevation view of the apparatus of FIG. 1, activated as shown in FIG. 8.
Figure 8:
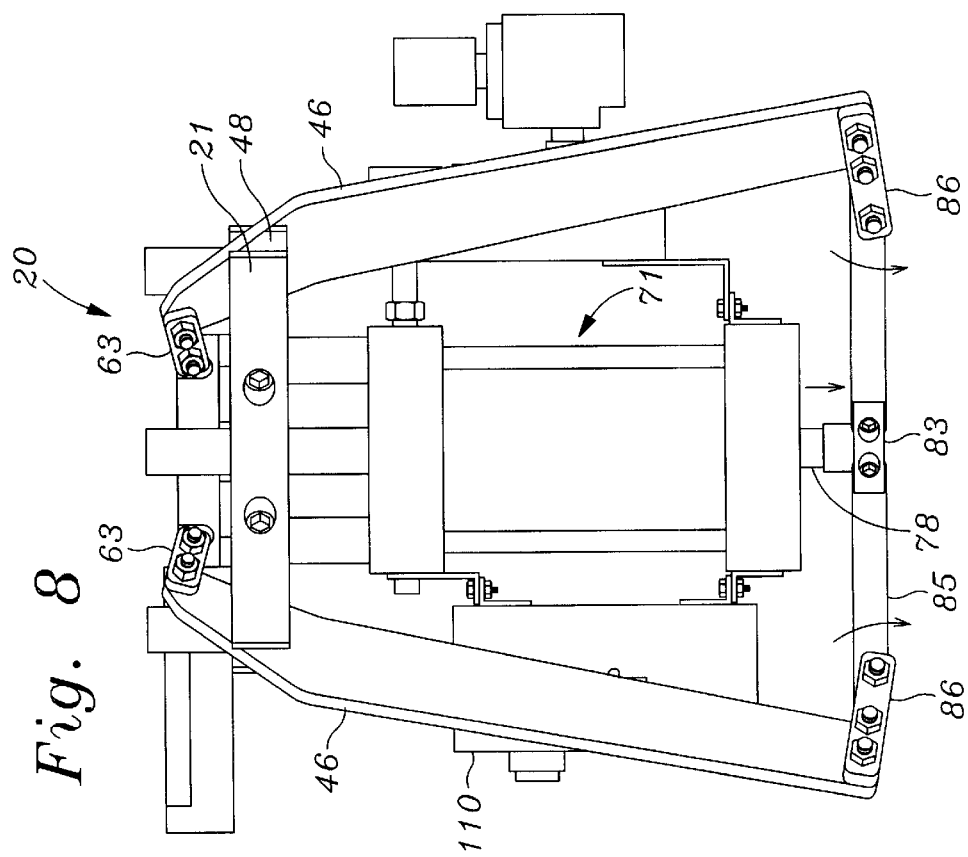
FIG. 8 is a front elevation view of the apparatus of FIG. 1, with the piston of the pneumatic actuator cylinder thereof in an active, up or retracted position of FIG. 7.

Pneumatic actuator cylinder 71 has an internal piston (not shown) connected to a piston rod 78 which protrudes outwardly through the center of lower bulkhead plate 74. In a quiescent, or inactive state of apparatus 20, piston rod 78 is extended at a maximum distance below lower bulkhead plate 74, as shown in FIGS. 1 and 2, and retracted fully to an active position, as shown in FIGS. 7, 8, and 9 by air pressure applied to a first, lower, upstroke air inlet port 79 which communicates with an interior, lower head space of cylinder body 72. Preferably, pneumatic actuator cylinder 71 is of the double acting type, having a second upper, downstroke air inlet port 80, which communicates with an upper head space of cylinder body 72, and when supplied with pressurized air, causes the cylinder piston and piston rod 78 to be driven downwardly to a fully extended position.

Figure 4:
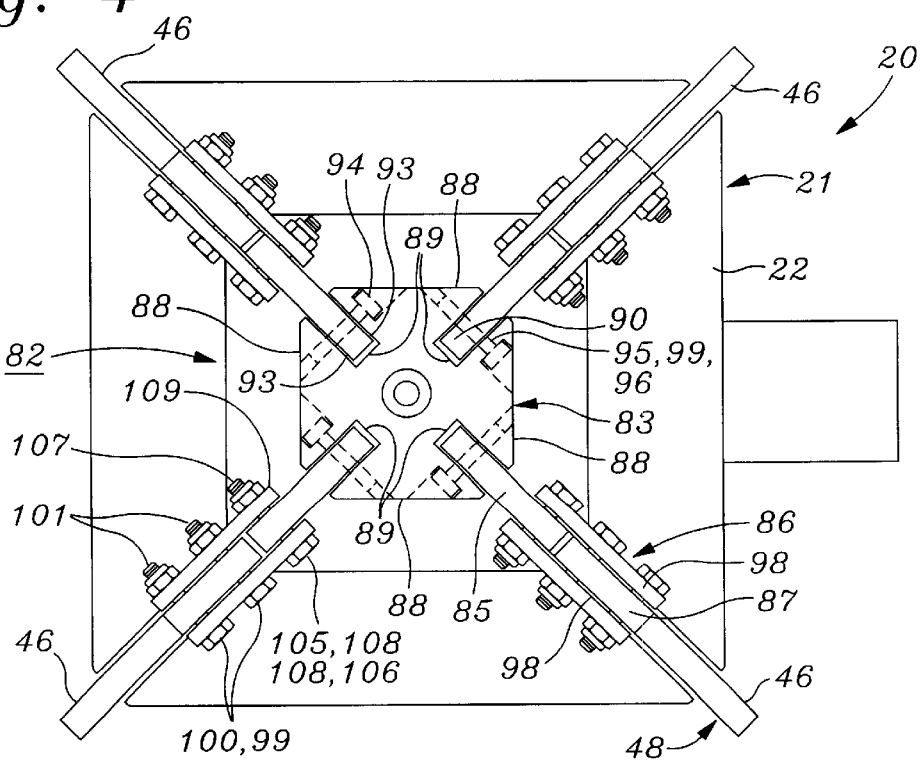
FIG. 4 is a lower plan view of the apparatus of FIG. 1.

As may be seen best by referring to FIGS. 1, 2 and 7, pneumatic actuator cylinder 71 comprises the force producing device for an actuator mechanism 81 which drives ram punches 39 in a radially reciprocating motion within work plate 22. Actuator mechanism 81 includes lever arms 46, upper linkage plates 63 and associated components which couple the upper ends of lever arms to the ram punches, as described above. Actuator mechanism 81 also includes a lower lever arm coupler mechanism 82 for coupling vertical reciprocal motion of actuator cylinder piston rod 78 to pivotable motion in a vertical plane of each lever arm 46. As shown in FIGS. 1, 2, and 3, lower coupler mechanism 82 includes a square pivot block 83 fastened to the outer or lower end 84 of piston 78. As shown in FIGS. 1 and 4, pivot block 83 is concentric with and disposed transversely to piston rod 78.

Referring now to FIGS. 1 and 4, it may be seen that lower pivot block 83 of lower lever arm coupler mechanism 82 has the shape of a horizontally disposed square plate which is perpendicular to piston rod 78 and rotated 45 degrees about the longitudinal axis of the piston rod with respect to square upper work table 21 of apparatus 20. Lower lever arm coupler mechanism 82 also includes a short, lower coupler bar 85 pivotably coupled at an inner end thereof to lower pivot block 83, and a lower transverse linkage bar 86 which is rigidly coupled at an outer end thereof to the lower end 87 of each lever arm 46. Lower transverse linkage bar 86 protrudes perpendicularly inwardly from the lower end of lever arm 46, and is pivotably coupled at an inner end thereof to the outer end of lower coupler arm 85. Thus, as shown in FIGS. 1 and 4, lower pivot block 83 has formed in each of the four-sided walls 88 thereof a notch 89 for pivotably receiving the inner end 90 of a separate lower coupler bar 85. As shown in FIG. 4, each notch 89 has a rectangular cross section, penetrates upper and lower walls 91 and 92 of lower pivot block 83, and protrudes perpendicularly inwardly from a side wall 88 towards the center of the pivot block. Inner end 90 of each lower coupler bar 85 is pivotably held between opposed vertically disposed side walls 93 of a notch 89 by a bolt 94 threaded through transversely aligned bores 95 and 96 in lower pivot block 83, and through a journal bore 97 provided through inner end 90 of the lower coupler bar.

Pivot block 83 could optionally be oriented with its sides parallel to that of supports plate 21. In this arrangement, slots 89 for pivotably receiving lower coupler bars 85 would be formed in the four diagonal corners of pivot block 83, paralleling diagonal notches 48 of work plate 21.

Referring still to FIGS. 1, 2 and 4, it may be seen that each lower coupler bar 85 is pivotably coupled at the outer end thereof to the inner end of a separate lower transverse linkage bar 86, which is rigidly fastened to the lower end 87 of a separate lever arm 46. As shown in the figures, each lower transverse linkage bar 86 may consist of a pair of laterally spaced apart, vertically oriented, parallel lower linkage plates 98, located on opposite transverse sides of lever arm 46 and lower coupler bar 85. Each linkage plate 98 has through its thickness dimension a pair of first and second outer longitudinally aligned bolt holes 99, and a pair of parallel, laterally opposed linkage plates is secured at a first, outer end thereof by a pair of bolts 100 each having a shank 101 which protrudes inwardly through first and second outer bolt holes 99, respectively, in a first linkage plate, first and second bolt holes 102 through lower end 103 of lever arm 46, and first and second outer bolt holes 99 through a second lower linkage plate, where the aforementioned parts are secured together by nuts 104. In a similar fashion, the inner longitudinal ends of lower linkage plates 98 are pivotably fastened to the outer end of a lower coupler bar 85 by an inner, pivot bolt 105 which protrudes through inner perforations 106 through a pair of opposed linkage plates 98 on opposite sides of the lower coupler bar, the shank 107 of the pivot bolt being disposed axially through a journal bore 108 and having a nut 109 which is tightened onto its shank to secure coupler bar and linkage bar in a manner permitting relative pivotable motion in a vertical plane of the two bars.

Referring again to FIGS. 1 and 2, it may be seen that apparatus 20 includes a control box 110 having an ON switch 111 and an OFF switch 112 for connecting and disconnecting the apparatus from power mains providing electrical power to the apparatus. Apparatus 20 also includes a solenoid valve bank 113 that is supplied pressurized shop air from an inlet port 114, through a pressure regulator, pressure gauge and exhaust muffler assembly 115. Solenoid valve bank 113 includes an upstroke pressurized air outlet port 116 which is coupled by a hose 117 to upstroke air inlet port 79 of pneumatic actuator cylinder 71, and a downstroke pressurized air outlet port 118 which is coupled by a hose 119 to downstroke air inlet port 80 of the cylinder.

Control box 110 is electrically coupled to a conductor pair 120, 121 which are connected internally to normally open and common contacts, respectively, of micro switch 36. Electrical circuitry within control box 110 is responsive to the depression of push button 37 of micro switch 36 to establish continuity between conductor pair 120, 121, producing an electrical signal which opens an upstroke solenoid valve in valve bank 113, thus applying pressurized air to upstroke input port 79 of pneumatic cylinder 71. This pressurized air causes piston rod 78 of cylinder 71 to be retracted vertically upward, as shown in FIGS. 8 and 9. A time delay circuit within control box 110 causes the upstroke inlet valve to remain open for a predetermined time interval, e.g., one second, whereupon the upstroke solenoid valve is deenergized, and a downstroke solenoid valve within solenoid valve bank 113 is electrically energized, which in turn causes pressurized air to be applied to downstroke port 80 of pneumatic cylinder 71. Supplying pressurized air to downstroke port 80 causes piston rod 78 of cylinder 71 to fully extend, restoring apparatus 20 to a quiescent, or inactive position, as shown in FIGS. 1 and 2. The construction and operation of electrical control circuitry, switch, and pneumatic solenoid valves just described are well known to those skilled in the art, and therefore need not be described here in further detail. Apparatus 20 preferably includes structural elements which facilitate accurate placement of an abutment structure A on work plate 22 of the apparatus in preparation for attaching the abutment structure to a threaded rod C. Thus, as shown in FIGS. 1–3, apparatus 20 preferably includes a feed ramp 122 for holding a quantity of abutment structures A in a single file column with the flanges B thereof facing down. Ramp 122 includes an elongated rectangularly-shaped block 123 having formed in the upper surface 124 thereof a rectangular cross-section channel 125 which spans the length of the block. Channel 125 has a width slightly greater than the diameter of base B of abutment structures A, and has a smooth upper surface 126 which slopes downwardly from a side of work table 21 to communicate with entrance opening 127 of notch 27 through outer circumferential wall surface 28 of work plate 22. For semi-automatic operation of apparatus 20, an individual abutment structure A may be manually advanced down ramp 122 into channel 27 and advanced radially inwardly through the channel into position against curved inner wall 31 thereof, preparatory to inserting a threaded rod C through the bore of the abutment structure for crimping the abutment structure and rod into locking engagement. In a fully automatic operational mode of apparatus 20, means for automatically advancing abutment structures A down ramp 122, such as by vibrating the ramp to facilitate gravity feeding of the abutment structure into channel 27, may be included.

OPERATION OF THE INVENTION

A method of manufacturing self-sealing reinforcement tie rods for HVAC ducts according to the present invention may be best understood by referring to FIGS. 5–12, in addition to FIGS. 1–4.

Referring now to FIGS. 1–4, apparatus 20 is shown in a quiescent or inactive state. The first step in a method of manufacturing a self-sealing reinforcement tie rod according to the present invention includes positioning the outer flange wall surface D of the flange B of an abutment structure A on lower flat wall surface 32 of notch 27 in work plate 22, coaxially over center 29 of the work plate. Preferably, an abutment structure A is loaded onto apparatus 20 by sliding the abutment structure downward on surface 126 of feed ramp 122 into slot 27 of work plate 22 until inward radial motion of the abutment structure is limited by contact of the annular edge of abutment structure flange B with arcuately curved inner edge wall 31 of the work plate slot.

Figure 6:
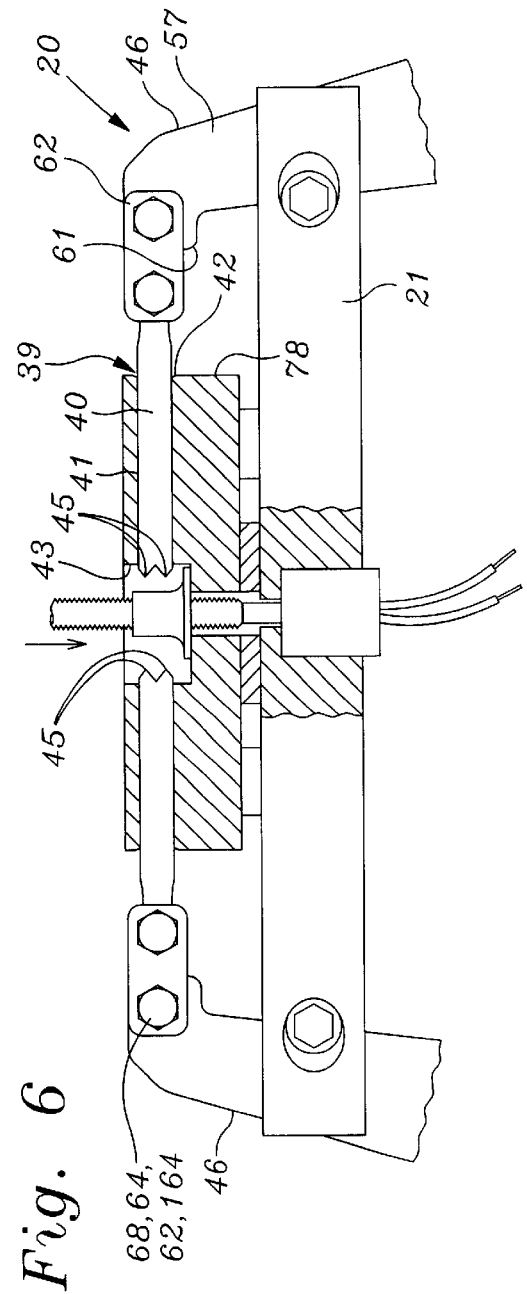
FIG. 6 is a view similar to that of FIG. 5, but showing a tie rod inserted partially through the abutment structure.

In the next step of the method according to the present invention, as shown in FIG. 5, a threaded rod C comprising a component of a complete self-sealing reinforcement rod E is positioned coaxially and above bore F through the abutment structure. Then, as shown in FIG. 6, threaded rod C is inserted into bore F through abutment structure A, and into pilot bore 33, to a depth at which the lower transverse wall of the threaded rod contacts the upper transverse wall of push button 37 of micro switch 36. As shown in FIG. 7, threaded rod C is pushed downward sufficiently far for push button 37 of micro switch 36 to be depressed, thus closing electrical contacts of the micro switch. As was described above, closure of electrical contacts in micro switch 36 closes an electrical circuit that includes an electrical power source and a solenoid valve, thus resulting in pressurized air being applied to upstroke port 79 of pneumatic actuator cylinder 71. This in turn causes piston rod 78 to be retracted upwardly into actuator cylinder 72 as shown in FIGS. 8 and 9. As is also shown in FIGS. 8, 9 and 11, upward motion of piston rod 78 causes the inner end of lower coupler bars 85 to pivot upwardly, the outer ends of the coupler bars to pivot downwardly, the lower ends 87 of lever arms 46 to pivot radially outwardly, and the upper ends 61 of the lever arms to pivot upwardly and radially inwardly.

Figure 12:
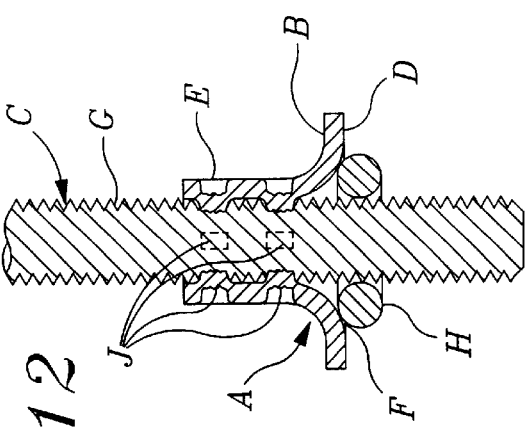
FIG. 12 is a longitudinal sectional view of a tie rod having an abutment: structure crimped thereto by the apparatus of FIG. 1, by the steps shown in FIGS. 5–11.

As shown in FIG. 10, radially inward motion of upper ends 61 of lever arms 46 causes a pair of chisel tips 45 at the inner or front longitudinal ends of each of the two pairs of radially opposed ram punches 39 to move radially inwardly towards one another to a minimum distance which is slightly less than the outer diameter of threaded rod C. As shown in FIG. 7, this action in turn causes the pair of vertically aligned chisel tips 45 at the inner radial end 44 of each ram punch 39 to form crimps J which indent the outer cylindrical wall surface E of an abutment structure A, and also the outer cylindrical wall surface G of threaded rod C. As shown in FIG. 12, the indenting action of ram punch chisel tips 45 on abutment structure A and on threaded rod C coaxially enclosed within bore F of the abutment structure causes metal from the inner cylindrical wall surface of the abutment structure to cold-flow into indentations with the cylindrical wall surface of the threaded rod. As shown in FIG. 12, the indentations made by chisel tips 45 in threaded rod C extend radially inwardly at least as deep as the roots of the threads on the threaded surface of the rod. Thus, metal which cold-flows from the inner wall surface of the abutment structure interlocks with the rod indentations, securely crimping the two parts together.

As described above, electrical control circuitry within control box 110 of apparatus contains a time delay circuit which causes ram punches 39 to retract axially through their bores from the center of work plate 22 after a predetermined time interval during which crimping pressure is applied to abutment structure A and threaded rod C. With ram punches 39 retracted at the end of this time interval, the upper end of threaded rod C may be grasped and pulled vertically upward, disengaging the lower end of the rod and abutment structure A. attached thereto from apparatus 20. Threaded rod C is then rotated end-to-end in a vertical plane, thus positioning the second, free end of the rod not yet having an abutment structure A attached thereto, above work plate 22 of apparatus 20. A second abutment structure A is then placed into crimping position on work plate 22, and crimped onto the second end of the threaded rod, in the manner described above, thus completing manufacture of a finished tie rod.

FIGS. 13–16 illustrate a modification of apparatus 20 depicted in FIGS. 1–12 and described above, which incorporates features by which manufacture of self-sealing reinforcement tie rods according to the present invention may be further automated.

As shown in FIGS. 13–16, a modified apparatus 130 for manufacturing self-sealing reinforcement tie rods according to the present invention is substantially similar in structure and function to apparatus 20 described above, with the following modifications, primarily to circular work plate 22 of apparatus 20. As may be seen best by referring to FIGS. 13 and 14, circular work plate 132 of modified apparatus 130 has a radially disposed notch 137 formed in the upper surface of the work plate, which is substantially similar to notch 27 of apparatus 20. Thus, notch 137 penetrates outer circumferential wall surface 138 of work plate 132, has parallel opposed vertical side walls 140, a flat lower wall 142, and an arcuately curved, generally semi-circular shaped inner transverse wall 141. Work plate 132 of modified apparatus 130 also has a circular pilot bore 143 protruding downward from lower wall 142 of notch 137, the pilot bore being concentric with center 139 of the work plate, and a curved inner transverse end wall 141. Notch 137 of work plate 132 is modified by the addition of a second radially disposed notch 147 centered on the same radial center line as notch 137, but diametrically opposed thereto.

Figure 13:
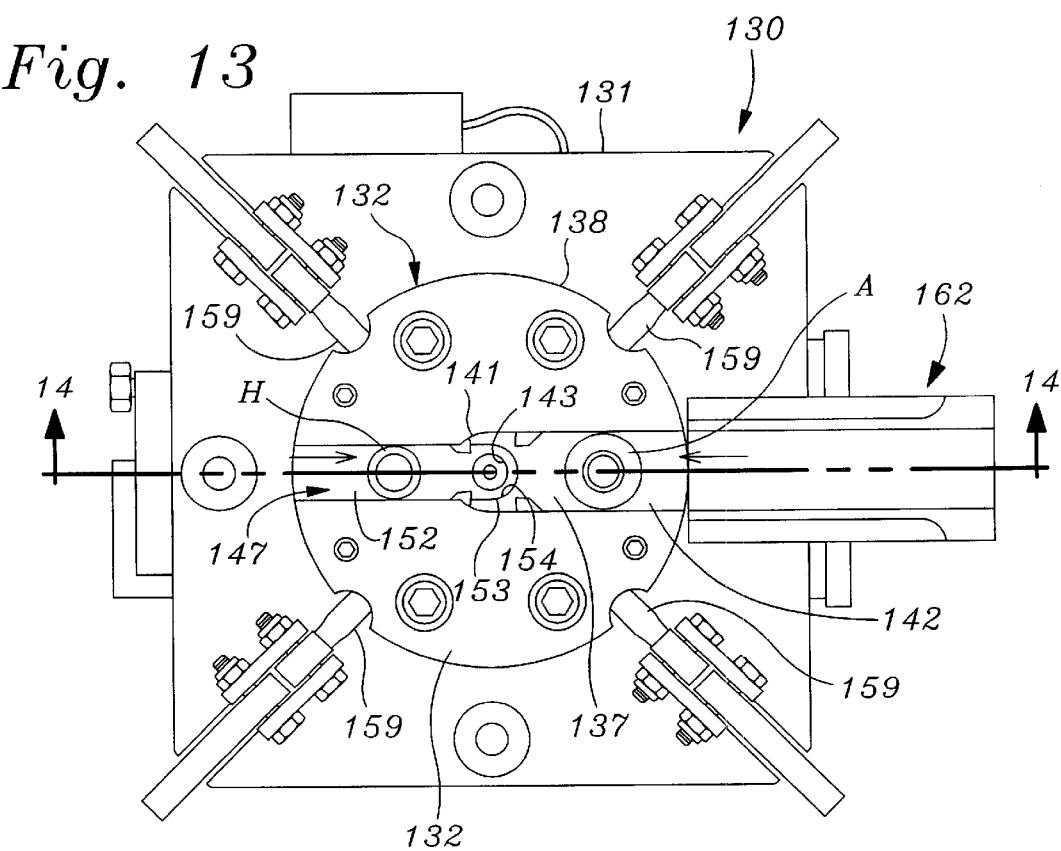
FIG. 13 is an upper plan view of a modification of the apparatus of FIG. 1.

As may be seen best by referring to FIG. 13, notch 147 has a width less than that of notch 137, and symmetrically penetrates inner curved end wall 141 of notch 137. The outer radial end of notch 147 penetrates outer circumferential wall surface 138 of work plate 132.

Notch 147 has a pair of opposed generally vertically disposed side walls 150, and a flat lower wall 152. The width of notch 147, defined by the perpendicular distance between vertical side walls 150, is slightly greater than the diameter of an O-ring H comprising a component of a self-sealing reinforcement tie rod which apparatus 130 is intended to be used to manufacture.

Figure 16:
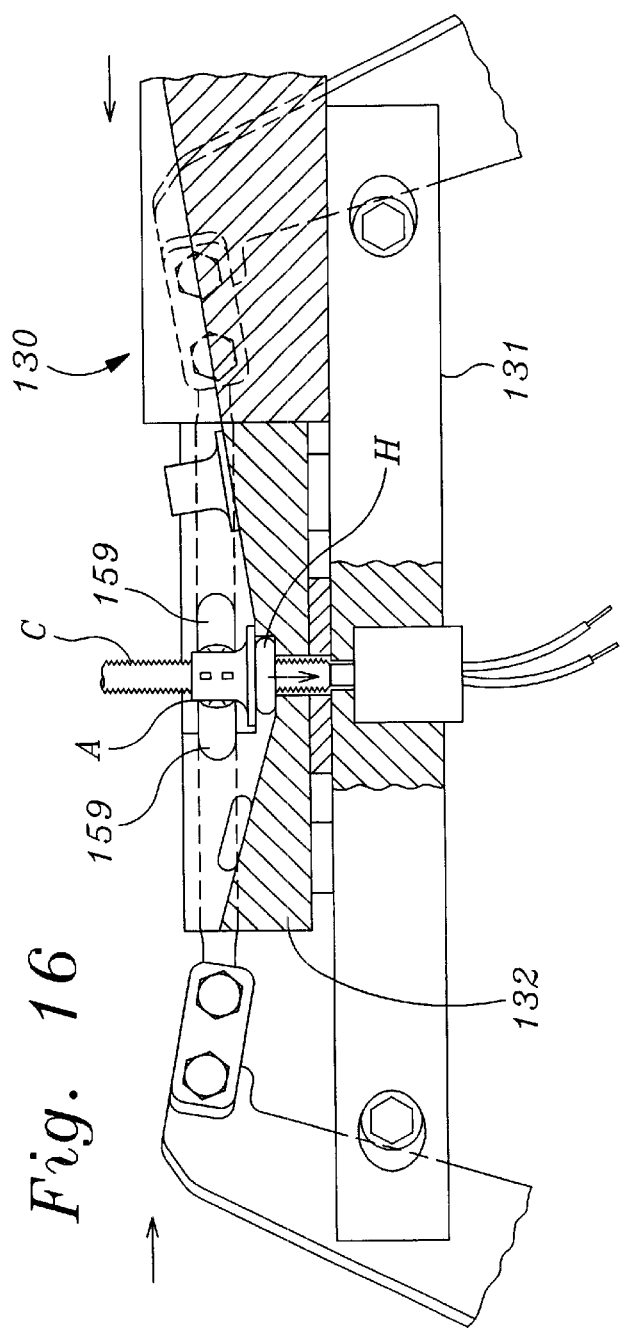
FIG. 16 is a view similar to that of FIG. 15, but showing ram punches of the apparatus actuated to crimp the abutment structure to the tie rod.

As may be seen best by referring to FIG. 14 in addition to FIG. 13, lower wall 152 of O-ring notch 147, terminates at the inner longitudinal end thereof in a generally semicircular shaped cavity 153 having an inner arcuately curved wall surface 154 which is concentric with center 139 and pilot bore 143 of work plate 132, and which is located on a radial side thereof opposed to the location of curved wall surface 141 of notch 137. With this construction, an individual O-ring H at the inner radial end of a single file column of O-rings may be slid radially inwardly along lower wall surface 152 of notch 147, and seated in O-ring cavity 153. With an O-ring H thus positioned, an abutment structure A may be slid radially inwardly on lower wall surface 142 of abutment structure notch 137 until inward radial-motion of the abutment structure is limited by contact of the annular edge of abutment structure flange B with arcuately curved inner edge wall 141 of the abutment structure notch. At this position, abutment structure A coaxially overlies O-ring H, whereupon a threaded rod C may be inserted downwardly through the bores of both the abutment structure and the O-ring, as shown in FIG. 15. When threaded rod C is pressed downwardly sufficiently far into pilot bore 143 to close micro switch 36, as shown in FIG. 16, ram punches 159 of apparatus 130 are driven radially inwardly by an actuator mechanism identical to that of apparatus 20 described above, to crimp abutment structure A onto threaded rod C, in the manner described above. Thus, when ram punches 159 are radially retracted after a predetermined compression time interval, threaded rod C and attached abutment structure A may be withdrawn vertically from apparatus 130. And, since the inner diameter of O-ring H is selected to be slightly less than outer diameter of threaded rod C, it remains thereon in an interference fit. Threaded rod C may then be reversed end-to-end, and a second O-ring and second abutment structure installed on that opposite end, in the manner just described, thus completing manufacture of a finished self-sealing reinforcement tie rod.

As shown in FIGS. 13–16, modified apparatus 130 is preferably provided with an abutment structure feed ramp 162 which is substantially similar in structure and function to that of feed ramp 122 of embodiment 20 of the apparatus described above. As is also shown in FIGS. 13–16, lower wall surface 142 of abutment structure notch 137 of apparatus 130 preferably slopes downwardly towards the center of work plate 132, to facilitate movement of abutment structures towards the center of the work plate. Preferably, lower flat wall 32 of notch 27 of apparatus 20 also slopes downwardly, for the same reason.

Referring still to FIGS. 13–16, it may be seen that lower wall surface 152 of O-ring notch 147 also preferably slopes downwardly towards the center of work plate 132, to facilitate movement of O-rings towards the center of the work plate. Apparatus 130 may also be provided with a ramp or other feed means for supplying O-rings to O-ring notch 147.

What is claimed is:

1. An apparatus for use in the manufacture of self-sealing reinforcement tie rods for reinforcing HVAC ducts, said reinforcement tie rods each including an elongated rod having fastened inwardly of each of two opposite longitudinal ends thereof an abutment structure comprising an elongated hollow tubular body coaxially overlying said rod, said tubular body having a longitudinally inwardly located tubular crown portion and a longitudinally outwardly located, radially outwardly protruding flange portion, said apparatus comprising;
   a. a work plate including locating means on the upper surface thereof for locating a said abutment structure in a predetermined work position, and a pilot bore located coaxially with respect to said work position and protruding inwardly from said upper surface of said work plate, said pilot bore including means for limiting downward movement of a said tie rod inserted through said abutment structure to a predetermined protrusion distance outwardly of said flange portion of said abutment structure, said locating means comprising a cavity protruding downwardly and inwardly from said upper surface of said work plate, said cavity having an inner arcuately curved end wall concentric with said pilot bore and having a radius slightly greater than that of said annular flange section of said abutment structure,
   b. at least a first pair of first and second diametrically opposed ram punches having a line of action including a radially inwardly directed component centered on a central longitudinal axis of said abutment structure, each of said ram punches having at an inner longitudinal end thereof at least a first chisel point for forming a crimping indentation in said tubular crown portion of said abutment structure, said ram punches being longitudinally slidably located in a first pair of longitudinally elongated, radially disposed, diametrically opposed ram punch bores in said work plate, said ram punch bores each having an entrance opening in an outer peripheral wall surface of said work plate and an exit opening communicating with said cavity, and
   c. ram punch actuator means for driving said ram punches radially inwardly sufficiently far for said opposed chisel points to depress a cylindrical wall of said inner tubular crown portion of said abutment structure into crimping engagement with said rod inserted through abutment structure, said ram punch actuator means comprising in combination,
      i. a linear actuator and
      ii. coupling means joining said linear actuator to said ram punch.

2. The apparatus of claim 1 wherein said rod is further defined as being threaded.

3. The apparatus of claim 2 wherein said crimping engagement is further defined as including indentation of an inner cylindrical wall surface of said tubular crown portion of said abutment structure sufficiently for said wall surface to penetrate grooves of said threads.

4. The apparatus of claim 3 wherein said crimping engagement is further defined as indenting said inner cylindrical wall surface of said tubular crown portion of said abutment structure sufficiently for said wall surface to penetrate said rod radially inwardly of the roots of said threads.

5. The apparatus of claim 1 further includes sensor means responsive to a said rod being inserted a predetermined distance into said pilot bore in energizing said ram punch actuator means.

6. The apparatus of claim 1 wherein said linear actuator is further defined as having a line of action perpendicular to said upper surface of said work plate.

7. The apparatus of claim 6 wherein said line of action of said linear actuator is further defined as being equidistant from said ram punch chisel points.

8. The apparatus of claim 7 wherein said coupling means is further defined as comprising in combination;
   a. a first, lower horizontally disposed pivot block fastened to a lower, outer end of a vertically movable output member of said linear actuator,
   b. a vertically disposed lever arm having an upper end pivotably fastened to a radially outward longitudinal end of said ram punch, and c. a lower coupler mechanism which pivotably couples a lower end of said lever arm to said pivot block.

9. The apparatus of claim 8 wherein said lower coupler mechanism is further defined as comprising in combination;
   a. a lower transverse linkage bar rigidly fastened to said lower end of said lever arm and which protrudes inwardly towards said output member of said linear actuator from said lever arm, and
   b. a lower coupler bar pivotably fastened at an upper end thereof to an inner end of said linkage bar, and pivotably fastened at a lower end thereof to a side of said pivot block.

10. An apparatus for use in the manufacture of self-sealing reinforcement tie rods for reinforcing HVAC ducts, said reinforcement tie rods each including an elongated rod having fastened inwardly of each of two opposite longitudinal ends thereof an abutment structure comprising an elongated hollow tubular body coaxially overlying said rod, said tubular body having a longitudinally inwardly located tubular crown portion and a longitudinally outwardly located, radially outwardly protruding flange portion, said apparatus comprising;
   a. a work plate including locating means on the upper surface thereof for locating a said abutment structure in a predetermined work position, and a pilot bore located coaxially with respect to said work position and protruding inwardly from said upper surface of said work plate, said pilot bore including means for limiting downward movement of a said tie rod inserted through said abutment structure to a predetermined protrusion distance outwardly of said flange portion of said abutment structure, said locating means comprising a cavity protruding downwardly and inwardly from said upper surface of said work plate, said cavity having an inner arcuately curved end wall concentric with said pilot bore and having a radius slightly greater than that of an annular flange section of said abutment structure,
   b. at least a first pair of first and second diametrically opposed ram punches having a line of action including a radially inwardly directed component centered on a central longitudinal axis of said abutment structure, each of said ram punches having at an inner longitudinal end thereof at least a first chisel point for forming a crimping indentation in said tubular crown portion of said abutment structure,
   c. ram punch actuator means for driving said ram punches radially inwardly sufficiently far for opposed chisel points to depress a cylindrical wall of an inner tubular crown portion of said abutment structure into crimping engagement with said rod inserted through said abutment structure, and
   d. an abutment structure loading slot protruding downwardly from said upper surface of said work plate, said loading slot being disposed radially away from said cavity and having longitudinally disposed side walls tangent at inner radial ends thereof to opposite ends of said arcuately curved end wall of said cavity.

11. The apparatus of claim 10 wherein said slot is further defined as having a bottom wall which slopes downwardly and radially inwardly towards said cavity.

12. The apparatus of claim 11 wherein said slot is further defined as penetrating an outer peripheral wall surface of said work plate.

13. An apparatus for use in the manufacture of self-sealing reinforcement tie rods for reinforcing HVAC ducts, said tie rods each including an elongated rod having fastened inwardly of each opposite longitudinal end thereof an abutment structure comprising an elongated hollow tubular body having a bore therethrough for coaxially receiving said rod, said tubular body having a longitudinally inwardly located tubular crown portion and a longitudinally outwardly located, radially outwardly protruding annular flange portion, said apparatus comprising;
   a. a work plate having a generally flat upper surface having formed therein a first downwardly protruding, flange cavity adapted to receive said annular flange portion of said abutment structure, and a pilot bore located below and coaxial with said cavity for receiving an end of a tie rod inserted downwardly through said bore of said abutment structure, said pilot bore having at the lower end thereof a base wall to limit downward movement of said tie rod inserted through said abutment structure to a predetermined extension distance outwards of said flange portion of said abutment structure, said flange cavity having an arcuately curved end wall concentric with said pilot bore,
   b. at least a first pair of first and second longitudinally elongated ram punches having a line of action including a radially inwardly directed component centered on a central longitudinal axis of said abutment structure, each of said ram punches having at an inner longitudinal end thereof at least a first chisel point for forming a crimping indentation in said tubular crown portion of said abutment structure,
   c. means for supporting said ram punches with respect to said work plate,
   d. reciprocating ram punch actuator means for driving said ram punches radially inwardly sufficiently far for said chisel points to depress a cylindrical wall of said inner tubular crown portion of said abutment structure to form crimping indentations engaging a said rod inserted through said abutment structure, and for retracting said ram punches after having made said crimping indentations,
   e. sensor means responsive to said rod being inserted a predetermined distance into said pilot bore in energizing said ram punch actuator means to move said ram punches in a radial inwardly direction, and
   f. switch means for energizing said ram punch actuator means to retract said ram punches, and
   g. an abutment structure loading slot disposed radially outwardly from said curved end wall of said flange cavity and beyond said pilot bore.

14. The apparatus of claim 13 wherein said abutment structure loading slot is further defined as including a lower, ramp floor which slopes downwardly and radially inwardly towards said pilot bore and said arcuately curved end wall of said flange cavity.

15. The apparatus of claim 13 further including an O-ring cavity depending downwardly from and concentric with said flange cavity.

16. The apparatus of claim 15 further including an O-ring loading slot formed in said upper surface of said work plate, said O-ring loading slot disposed radially outwardly from said pilot bore.

17. The apparatus of claim 16 wherein said O-ring loading slot is further defined as penetrating said arcuately curved flange cavity end wall.

18. The apparatus of claim 16 wherein said O-ring loading slot is further defined as including a lower, ramp floor which slopes downwardly and radially inwardly towards said O-ring cavity.

19. The apparatus of claim 13 further including a second pair of ram punches having a line of action including a radially inwardly directed component rotated at a polar angle with respect to said line of action of said first pair of ram punches.

20. The apparatus of claim 19 wherein said polar angle is further defined as being substantially equal to ninety degrees.

* * * * *